(12) United States Patent
Shepshelovich et al.

(10) Patent No.: US 8,123,160 B2
(45) Date of Patent: Feb. 28, 2012

(54) AIRCRAFT CONFIGURATION FOR MICRO AND MINI UAV

(75) Inventors: Michael Shepshelovich, Ganey Tikva (IL); Mario Sletean, Ashdod (IL); Moshe Steinbuch, Raanana (IL); David Eli Levy, Netanya (IL)

(73) Assignee: Israel Aerospace Industries Ltd., Lod (IL)

( * ) Notice: Subject to any disclaimer, the term of this patent is extended or adjusted under 35 U.S.C. 154(b) by 517 days.

(21) Appl. No.: 10/573,570

(22) PCT Filed: Jul. 22, 2004

(86) PCT No.: PCT/IL2004/000668
§ 371 (c)(1),
(2), (4) Date: Jul. 11, 2006

(87) PCT Pub. No.: WO2005/030578
PCT Pub. Date: Apr. 7, 2005

(65) Prior Publication Data
US 2007/0029440 A1 Feb. 8, 2007

(30) Foreign Application Priority Data
Oct. 2, 2003 (IL) .......................................... 158215

(51) Int. Cl.
*B64C 39/12* (2006.01)
(52) U.S. Cl. ........................................ 244/45 R; 244/13
(58) Field of Classification Search ................ 244/45 R, 244/13, 35 R
See application file for complete search history.

(56) References Cited

U.S. PATENT DOCUMENTS

| | | | |
|---|---|---|---|
| 1,839,194 A | | 1/1932 | Blondin |
| 2,147,968 A | * | 2/1939 | Delanne .......................... 244/13 |
| 2,151,128 A | | 3/1939 | Looney |
| D166,843 S | * | 5/1952 | Bailey ........................... D12/331 |
| 2,699,299 A | * | 1/1955 | Herrick ......................... 244/7 A |
| 3,202,383 A | | 8/1965 | Le Bel |
| 3,744,741 A | | 7/1973 | Christian et al. |
| 3,942,747 A | | 3/1976 | Wolkovitch |
| 3,954,231 A | * | 5/1976 | Fraser ........................... 244/225 |
| 3,985,317 A | * | 10/1976 | Geraci et al. .................... 244/13 |
| 4,030,688 A | | 6/1977 | Pellarini |

(Continued)

FOREIGN PATENT DOCUMENTS

DE 223160 7/1909

(Continued)

OTHER PUBLICATIONS www.fantastic-plastic.com/milesM35Page.htm, Oct. 3, 2004.*

(Continued)

*Primary Examiner* — Joshua Michener
*Assistant Examiner* — Brian M O'Hara
(74) *Attorney, Agent, or Firm* — The Nath Law Group; Susanne M. Hopkins; William L. Klima

(57) ABSTRACT

An aircraft arrangement for Mini or Micro UAV comprising a fore wing (14) and an aft wing (12) in tandem closed-coupled arrangement. The aft wing (12) has side panels (18) and control surfaces (19), and tapered planform with positive sweep, while the fore wing (14) has non-positive trailing edge sweep. The fore wing (14) and the aft wing (12) are disposed at different height, and the aircraft arrangement has no other wings or tail arrangements.

42 Claims, 5 Drawing Sheets

U.S. PATENT DOCUMENTS

| | | | |
|---|---|---|---|
| 4,390,150 A * | 6/1983 | Whitener | 244/45 R |
| 4,907,764 A | 3/1990 | Long | |
| 5,407,150 A | 4/1995 | Sadleir | |
| 5,890,441 A * | 4/1999 | Swinson et al. | 244/12.3 |
| 6,098,923 A * | 8/2000 | Peters, Jr. | 244/45 R |
| 6,193,464 B1 * | 2/2001 | Nyhus et al. | 416/32 |
| 6,607,162 B2 * | 8/2003 | Warsop et al. | 244/12.6 |
| 6,626,398 B1 * | 9/2003 | Cox et al. | 244/45 R |
| 6,874,729 B1 * | 4/2005 | McDonnell | 244/63 |
| 2002/0030142 A1 | 3/2002 | James | |
| 2003/0155463 A1 * | 8/2003 | Cox et al. | 244/3.1 |
| 2007/0215751 A1 * | 9/2007 | Robbins et al. | 244/55 |
| 2008/0184906 A1 * | 8/2008 | Kejha | 102/374 |

FOREIGN PATENT DOCUMENTS

| | | | |
|---|---|---|---|
| DE | 4212201 A | 10/1992 | |
| EP | 0 315 843 | 5/1987 | |
| FR | 943.005 | 2/1949 | |
| FR | 943005 A * | 2/1949 | 244/45 R |
| FR | 57 516 | 1/1953 | |
| JP | 200023 | 8/2000 | |
| PL | 149 975 | 8/1990 | |
| WO | WO 01/62591 A1 | 8/2001 | |

OTHER PUBLICATIONS

Dempsey, Patrick, et al.; "Micro Air Vehicle A&AE 490 AT 490", (Spring 1999), www.tech.purdue.edu/at/courses/at490/Watkins/Watkins,Joint Engineering Technology.

Bostjancic, Jason, et al.; "Multidisciplinary Optimization Report for U.F.O.: University of Florida Observer Aircraft Design and Optimization", Second Annual ISSMO Micro Aerial Vehicle Competition, University of Florida, Dept. of Aerospace Engineering, Mechanics and Engineering Sciences (May 9, 1998).

McMichael, James M., et al.; "Micro Air Vehicles—Toward a New Dimension in Flight", www.darpa.mil/tto/MAV/mav auvsi, (Aug. 7, 1997).

Birtwhistle, James; "An Investigation into Micro Air Vehicles" The 2001 Science, Engineering & Technology Student of the Year Awards, Loughborough University, (2001).

Hewish, Mark; "A bird in the hand Miniature and micro air vehicles challenge conventional thinking" Jane's International Defense Review, vol. 32, pp. 22-28, XP000908166 (Nov. 1999).

Dempsey, et al. "Micro Air Vehicle A&AE 490 AT 490". Spring 1999. (pp. 2-3—Calculations, Design, Construction and Conclusion Sections.) www.tech.purdue.edu/at/courses/at490/Watkins/Watkins,Joint_Engineering_Technology_Re...

Miles M. 35 Libellula 1942, available at http://www.aviastar.org/air/england/miles_m-35.php, accessed on Feb. 22, 2010.

D. E. Levy et al. Design of MICRO/MINI UAV Wings. 44th Israel Annual Conference on Aerospace Sciences. (2004): 1-20.

A. Nagel et al. Conceptual Aerodynamic Evaluation of MINI/MICRO UAV. American Institute of Aeronautics and Astronautics 44th Aerospace Sciences Meeting and Exhibit. (2006): 1-23.

D. E. Levy et al. Design of MICRO/MINI UAV Wings. American Institute of Aeronautics and Astronautics 44th Aerospace Sciences Meeting and Exhibit. (2006): 1-20.

A. Nagel et al. Conceptual Aerodynamic Evaluation of MINI/MICRO UAV. 44th Israel Annual Conference on Aerospace Sciences. (2004): 1-20.

McMasters, et al., "Low-Speed Single-Element Airfoil Synthesis", Boeing Commercial Airplane Co., MPA Symposium, 1978, 31 pages.

"This page is devoted to Reynolds Number and the effects of scaling in the real world" (internet site (2002): http://www.angelfire.com/on/dragonflyaircraft/RNumber.html), 3 pages.

* cited by examiner (a) $C_{M0} > 0$ (b) $C_{M0} \sim 0$

AIRCRAFT CONFIGURATION FOR MICRO AND MINI UAV

CROSS-REFERENCE

This is a National Phase Application filed under 35 U.S.C. 371 of International Application No. PCT/IL2004/000668, filed Jul. 22, 2004, the entire content of which is hereby incorporated herein by reference in its entirety.

FIELD OF THE INVENTION

This invention relates to tandem aircraft arrangements, in particular for application in Micro and Mini UAV (Unmanned/Unihabited Aircraft Vehicles)

BACKGROUND OF THE INVENTION

The advance of technology in the end of 20th century, especially in micro-technologies, including micro-mechanical systems, communication and control devices, made it feasible to design and manufacture unmanned aircraft capable of performing various military and civilian missions. In 2001, about 50 US companies, academic institutions, and government organizations have been developing over 150 UAV designs. About 115 of these designs are flying, while some 26 models of UAV's are in exploitation or ready for production. Most of the UAV used today are in fact small airplanes measuring 2 m and more wingspan and capable to operate at tens and hundreds of miles range.

In the 1990s, new classes of UAV started to develop: Mini and Micro-UAV. Mini-UAV are vehicles of about 20 cm to 1.2 m size while Micro-UAV are limited to 6 inches (15 cm) in either dimension, according to the definition of Defense Advanced Research Project Agency (DARPA) of the USA. The aerodynamic design of such small vehicles is not tractable by well-developed methods applied to conventional aircraft, mainly due to the low Reynolds number of their flight ($2*10^4$-$3*10^5$), and the requirement of low flight speed, which is comparable with moderate wind speeds, such as 10-20 m/s.

An example of Mini-UAV is the "Sender" of the US Naval Research Laboratory. It has a classical rectangular wing, tractor propeller and V-like empennage. The wingspan is 1.2 m and the flight weight is 4.5 kg. The vehicle is launched from a catapult and has near 100-mile range capability.

Very intensive research and design effort takes place in the Micro-UAV (MAV) applications. From the late 1990s, American universities stage yearly competitions of MAV, while governmental and commercial laboratories pursue projects of mission-worthy vehicles.

MicroSTAR MAV of Sanders AS&T group and Lockheed is an operable prototype with flying wing configuration. The air vehicle has delta wing with 9-inch span, side panels and tractor propeller driven by an electric motor. It is capable to carry miniature video and IR cameras, communication and control means in a 2-mile range.

Intelligent Automation, Inc has designed and fabricated a 15 cm, 90 g MAV designed to fly at 40 mph for about 20 min, carrying a video camera, two-way RF communication receiver, and servomotors. The MAV has classical wing arrangement with swept wings, horizontal stabilizers, vertical keel, and tractor propeller driven by an internal-combustion engine.

The above-mentioned competitions and academia projects have brought up other aerodynamic designs seeking greater lift at reduced flight speed acceptable stability and controllability:

Mississippi State University "SKYDOG" with triplane wing configuration, two keels, horizontal stabilizer connecting the keels, and tractor propeller;

University of Notre Dame MAV with flying wing of inverse Zimmerman planform (squared-off), central vertical keel and tractor propeller;

University of Florida MAV with biplane tailless configuration. Two vertical fins connect the two wings at ¾ of the semi-span from the center plane. The upper wing is displaced about half-chord to the rear.

A number of projects make use of the known fact in the aerodynamic design that double-wing configurations, such as biplane and tandem, provide greater lift and reduced induced drag in comparison to a single wing configuration.

The "Outrider" UAV of Alliant Techsystems has two essentially straight tandem wings with 3.30 m span, with the forewing above and the aft wing below the fuselage. Side panels to form a rigid frame connect the wingtips. The vehicle has a T-like empennage.

DE 43 32 867 suggests a similar configuration but closer to biplane because the two wings are also overlapping each other.

U.S. Des. Pat. No. 166,843 suggest a light aircraft tandem configuration with two swept wings, the forewing being above the fuselage, and a pushing propeller. The aircraft has two vertical keels with rudders behind the aft wing.

Small vehicle size must be convenient to operate in close proximity to a point of interest without being detected, loitering for 0.5-1 hour, and then returning. The aircraft must be able to fly in turbulent and high winds speed, to provide reasonable rate of climb, tight turns and be stable enough to serve as an airborne video platform. The aircraft must be easy enough to operate, so that soldiers may deploy it in the field with minimal training.

There is a clear conflict between constrains imposed on dimensions of Micro and Mini UAV and requirements to fly at reduced airspeeds with acceptable flying qualities and maneuver capabilities. Typical configurations that try to achieve maximum exploitation of the allowable area (rectangular, delta, ogive wings, etc.), suffer from poor aerodynamic efficiency, low values of maximum lift and problematic stability and control characteristics. The flight of these types of configurations relies massively on sophisticated flight control, while their performance is penalized by excessive weight of the battery (electric propulsion case) that should be carried for overcoming its poor aerodynamic efficiency.

Typical configurations of MUAV use overpowered engines for overcoming its poor aerodynamics efficiency and suffer from excessive weights of batteries, engine plant and airframe. In flight, this results in increased air speed, which harms loitering performance, take off/landing characteristics and quality of video display.

SUMMARY OF THE INVENTION

Glossary

Biplane: Airplane with two overlapped wings spaced vertically.

Control surface: Aircraft component used for trim and for producing required orientation and maneuver of the aircraft.

Dihedral angle: Design angle between a wing surface and horizontal plane.

Directional stability: The aerodynamic capability of an aircraft to return to its original attitude after a small instantaneous disturbance in yaw or/and roll attitude.

Lift: The component of the aerodynamic force, which is perpendicular to the freestream velocity vector Lifting surface: Any wing-like component that provides lift.

Longitudinal stability: The aerodynamic capability of an aircraft to return to its original attitude after a small instantaneous disturbance in pitch attitude.

Side panel: A lifting surface joined perpendicularly or almost perpendicularly at the wing tip chord.

Stall: Aerodynamics phenomenon in which aircraft wing experiences increased air resistance and decreased lift, due to flow separation on the wing at great angle of attack or/and low speed. Stall limits maximum attainable lift.

Stall speed: The minimal airspeed that may be attained in straight level flight at given conditions of weight and height.

Sweep (angle) of wing line: Angle measured between a line on the wing (such as a leading or trailing edge) and a perpendicular to the root chord. The sweep is positive if the tip end of the line is further aft than its root end.

Sweep of wing (wing sweep): Sweep angle of the line connecting half-cords of the wing. A swept wing has positive wing sweep.

Tandem: Wing arrangement of two wings shifted forward and backward.

Taper: The ratio between wing's tip chord and root chord.

Twist (angle): The angle between the chord line of a specific wing section and the chord line of the wing root section.

Wing: Aircraft component providing lifting force (lift) to support the aircraft in the air. A wing is defined by airfoil sections along the wing span.

Wing area: The plan surface of the wing, including a portion of the area adjacent to the centerline and covered by the fuselage.

Wing span: Distance between wing tip's chords measured perpendicularly to the centerline.

In accordance with the present invention, there is provided an aircraft arrangement for Mini or Micro UAV comprising a fore wing and an aft wing in tandem closed-coupled arrangement. The aft wing has swept-tapered planform with side panels and control surfaces. The forewing and the aft wing are disposed at different height, and the aircraft arrangement has no other wings or tail arrangements.

Preferably, the aft wing has straight leading edge with positive sweep angle while the fore wing has straight trailing edge with negative sweep angle. The wing tips may be rounded. A portion of the aft wing trailing edge may have negative or positive sweep angle.

The aft wing is mounted on a fuselage and the forewing is preferably mounted to the upper side of the fuselage on one or more pylons. The forewing is preferably higher than the aft wing at least by an average aft wing cord, and may partially overlap it.

If the tandem arrangement has overall width W and overall length L including any control surfaces, preferably the sum of planform wing areas of the tandem arrangement is at least 70% of the product W×L, preferably close to 75%.

The aft wing may have aspect ratio between 2.5 and 4, preferably close to 3.

The projected areas of the aft wing and the fore wing are preferably in ratio between 2:1 and 1:1.

The aft-wing preferably has rudder control surfaces on its side panels. The forewing also may have side panels with rudder control surfaces.

The aircraft preferably has a tractor propeller mounted in front of the tadem wing arrangement.

The aft wing and/or the forewing may have non-zero dihedral angle, preferably such that the vertical distance between tip chords of the fore wing and the aft wing is greater than the vertical distance between their respective root chords.

The fore and/or aft wing may have variable twist along their span. Preferably, the aft wing has positive angle of incidence. Preferably, the aft wing has airfoils with positive zero-lift pitching moment.

In one embodiment of the present invention, the fore wing, the aft wing and other elements of said UAV are disposed so as to provide longitudinal aerodynamic instability. In this case, the self-propelled UAV may have a pushing propeller and the aircraft arrangement may have negative pitching moment at zero-lift.

The proposed tandem arrangement will be hereinafter called "X-plane" because of its characteristic planform best seen in FIG. 1C and because of it's front view best seen in FIG. 1D.

Advantages

The proposed aircraft arrangement for Mini and Micro UAV, in its stable configuration, provides simultaneous improvement of lift-carrying and maneuver capabilities, extended speed range, enhanced aerodynamic efficiency, control power in longitudinal and directional stability planes, aerodynamic passive self-recovery at stall in the pitch plane that guarantee a safe flight in gusty air.

The close-coupled wings provide maximum exploitation of the area (load-carrying capability) together with improved aerodynamic efficiency, enhanced control power and acceptable stability.

The side panels mounted on the aft wing provide an improved effective aspect ratio of the configuration that reduces the induced drag.

The pylon/s and wing dihedral produce the spacing between the wing's tips that helps to reduce induced drag and provide loading distribution that is favorable for maximum lift.

Known MiniMicro UAVs have some difficulties to answer performance requirements for realistic weight of components and payload. On the contrary, the X-Plane is capable to comply with the following operational requirements:

Payload of 25% of take-off weight;
Minimum speed of 10 m/s;
Minimum flight time of 1 hr;
Rate of climb greater than 300 ft/min;
Turn radius less than 10 m;
Acceptable flying qualities.

The principal advantage of the X-Plane is its feature of package solution that provides a simultaneous answer to all significant aeromechanical aspects in development of Micro/Mini UAV, helping to bridge between conflicting requirements.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1A:
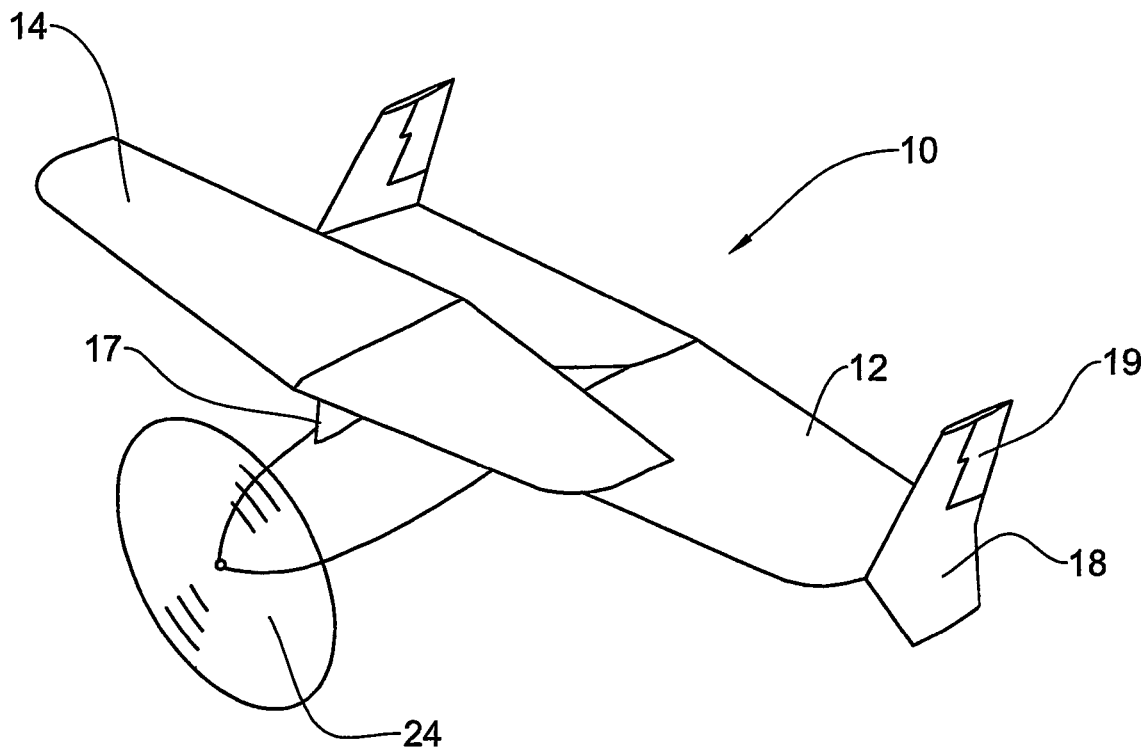
FIGS. 1A, 1B, 1C and 1D are schematic views of a basic UAV configuration in accordance with the present invention.
Figure 1B:
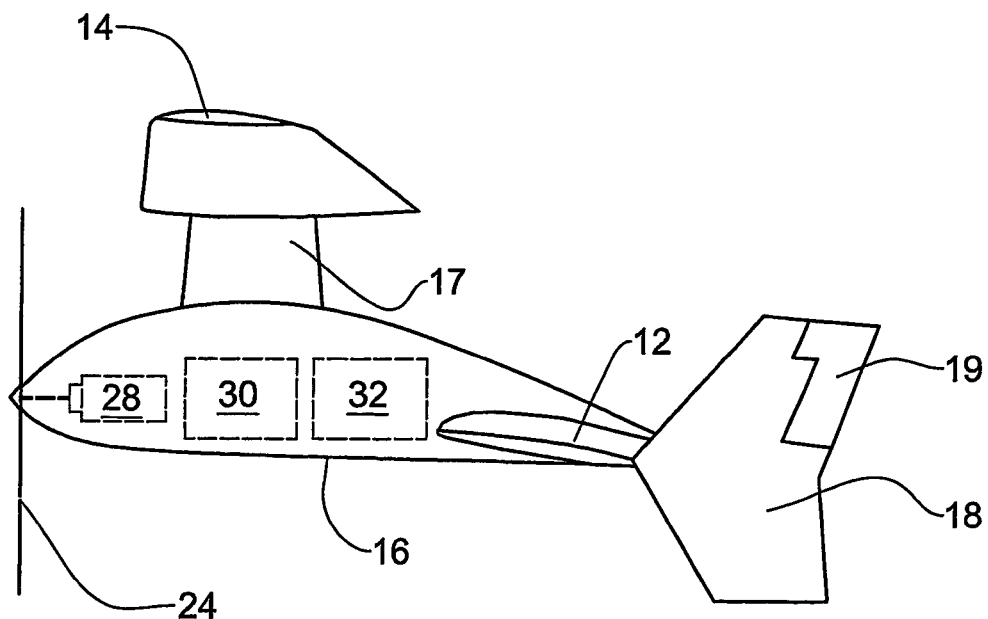
Figure 1C:
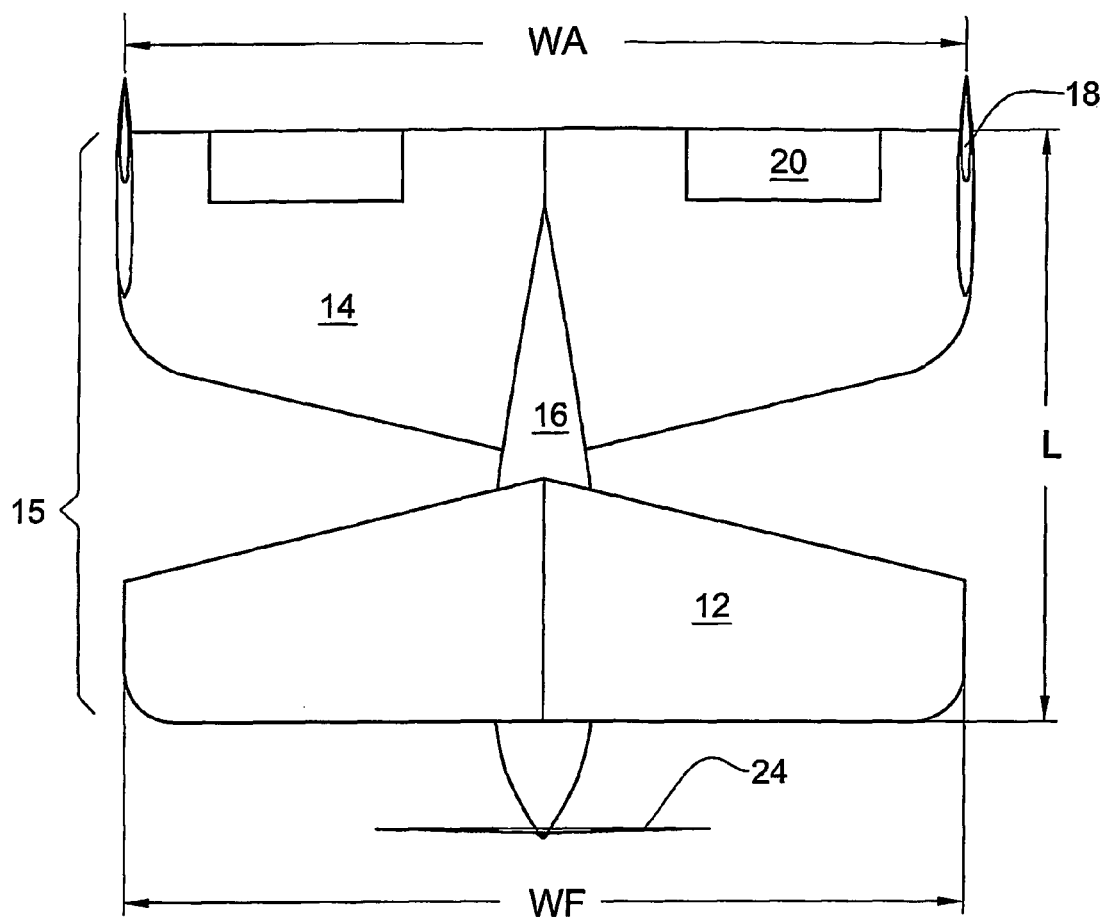
Figure 1D:
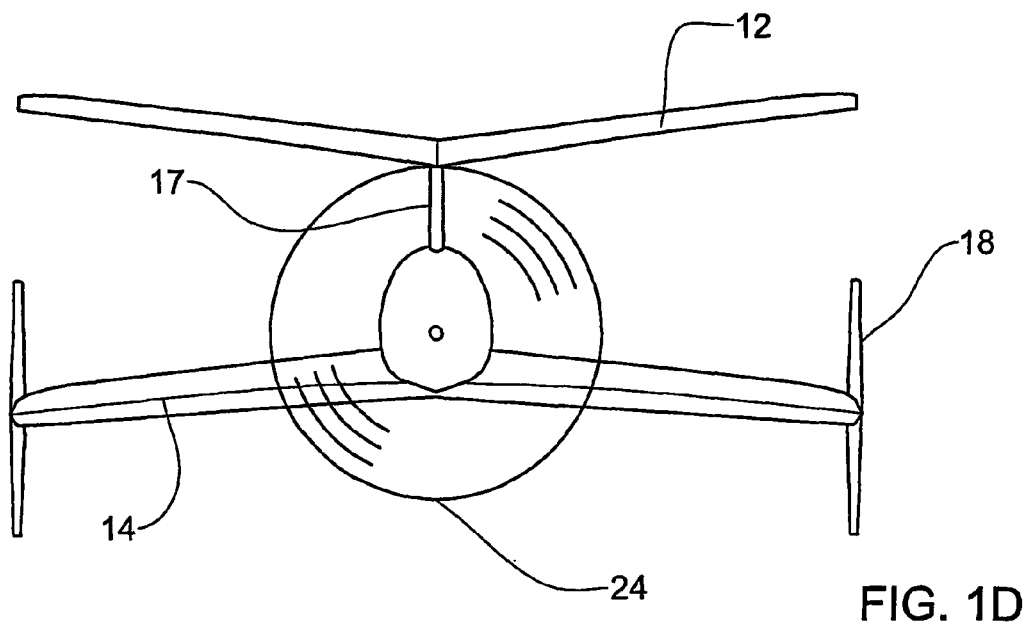

With reference to FIGS. 1A, 1B, 1C and 1D, there is shown an aircraft arrangement "X-plane" of a self-propelled Mini- or Micro-UAV 10 comprising a fore wing 12 and an aft wing 14 in tandem arrangement 15, mounted on a fuselage 16.

The aft wing 14 is mounted on the fuselage 16 as lower wing and the forewing 12 is mounted on a pylon 17 to the fuselage 16 as upper wing.

The aft wing 14 has swept-tapered planform with negative (downward) dihedral angle, with control surfaces (elevons) 20. The aft wing also has side panels 18 with rudder controls 19. The forewing 12 has also tapered planform but with negative sweep, and dihedral with positive (upward) dihedral angle.

The X-plane 10 includes also a tractor propeller 24 with power plant 28, batteries 30, payload 32 and others components (not illustrated). The wings and the other elements of the UAV are disposed so as to provide longitudinal stability.

The two wings 12 and 14 of the X-plane have moderate aspect ratio, about three for the aft wing and four for the forewing. The two wings are disposed in close-coupled arrangement, where the average gap between the trailing edge of the forewing and the leading edge of the aft wing is less than the forewing root chord. The wings may partially overlap each other, so as to provide maximum area and benefit from biplane effect. (Overlapping is accounted as negative gap)

Figure 2:
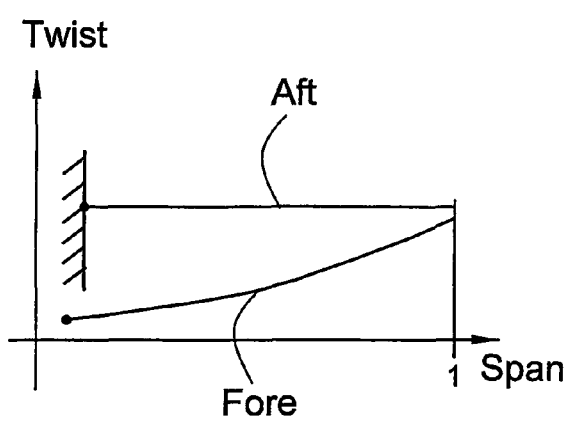
FIG. 2 is a diagram of wing twist distribution along the wingspan of the forewing.

With reference to FIG. 2, the wings of the X-plane have span-wise twist. The wing sections airfoils types used for the aft wing are illustrated in FIG. 8(a), and for the fore wing, in FIG. 8(b). Symmetrical NACA airfoils are used for the side panels 18 and the pylon 17.

The major performance features of the X-plane configuration are as follows:

Maximum Lift and Stall Self-Recovery

Figure 3:
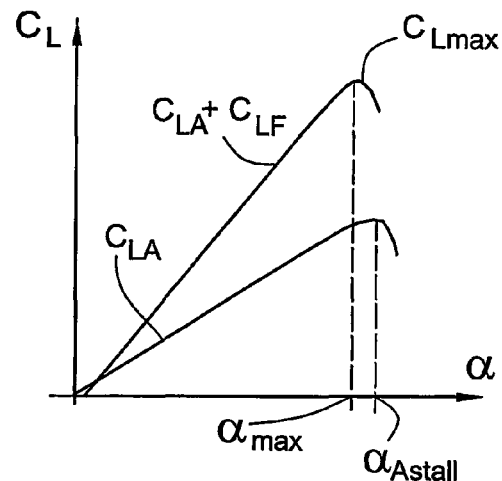
FIG. 3 is a diagram of wing lift coefficient of wing components.

With reference to FIG. 3, the maximum lift $C_{Lmax}$ of the X-plane tandem configuration 15 is achieved at angle of attack $\alpha_{max}$ prior the aft wing stall at $\alpha_{Astall}$.

Figure 4:
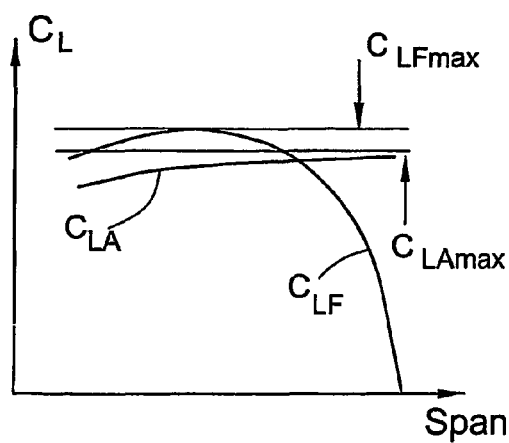
FIG. 4 is a diagram of spanload distribution at maximum lift of the fore and aft wing illustrating stall self-recovery property of the X-plane.

The spanload distributions of the fore wing and aft wing at stall (at $C_{Lmax}$) are illustrated in FIG. 4. Stall starts at the center of the forewing span while the aft wing has a proper margin to stall.

This provides built-in mechanism of passive-self recovery at stall in the pitch plane and ensures effective exploitation of the area of the tandem arrangement 15 for generating maximum lift. These features of the X-Plane are provided by a proper design of wing angles of incidence, twist and airfoils aerodynamics characteristics.

The slipstream of front propeller assembly contributes to maximum lift especially at high values of thrust coefficient.

Aerodynamic Efficiency

It should be understood that the requirement for maximal lift coefficient at large angles of attack is a trade-off with the aerodynamic efficiency at cruise flight.

Figure 5:
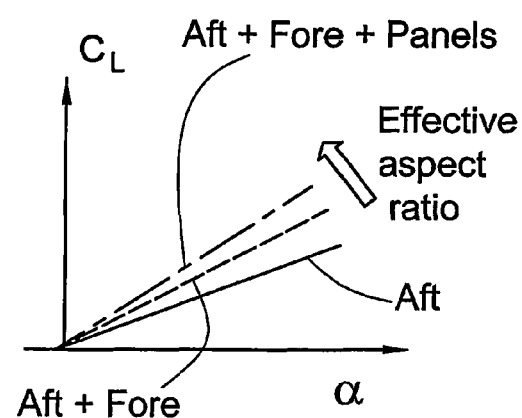
FIG. 5 is a diagram of the wing lift and overall lift coefficients illustrating the beneficial effect of the side panels and the coupling of the two wings.
Figure 6:
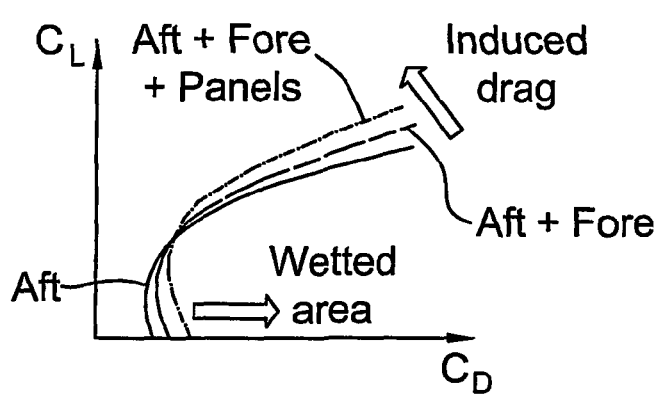
FIG. 6 is a diagram of the X-plane polar $C_L/C_D$ illustrating benefits of the induced drag reduction v/s increased wetted area in the X-plane configuration.

For the X-Plane, the coupling of two wings of moderate aspect ratio and the beneficial effect of the side planes produce an effect of increased effective aspect ratio, coming with reduced level of induced drag and improved aerodynamic efficiency—as shown in FIGS. 5-6 (the normalization of aerodynamic coefficients being based on aft wing area).

Thus, the X-plane configuration allows achieving combined span load close to the optimum elliptical distribution, with minimal induced drag at cruise/loitering flight. The employed twist and taper design values also serve this purpose.

Fore-Aft Wing Interaction

In designing specific span loads of the two wings, the mutual upwash/downwash effects with varying angle of attack can be accounted for, in order to comply simultaneously with requirements of maximum lift and minimum induced drag at cruise lift coefficients.

The two pairs of wings staggered both in vertical and in horizontal direction provide beneficial reduction of induced drag, improving the aerodynamic efficiency of the configuration. The load distributions of aft/fore wings provide an improved maximum lift constrained by the requirement of passive self-recovery at stall (nose-down moment due to stall of fore wing).

The X-shape planform provides for beneficial interaction of the close-coupled central wing parts while wing tips are spaced far apart to avoid adverse interaction.

Increased Effective Aspect Ratio

The beneficial effect of the side panels 18, together with the drag reduction due to wings interaction, produces the effect of increased effective aspect ratio, coming with reduced induced drag and improved aerodynamic quality $C_L/C_D$, as shown in FIGS. 5 and 6. This improves the climb and endurance performance of the tandem configuration 15, overcoming the defect of increased wetted area v/s the single wing option. Reduced level of induced drag and improved values of maximum lift help to realize optimum range and endurance performance at increased values of lift coefficients, complying, at the same time, with a required speed safety margin.

Self-Trimming

Figure 7:
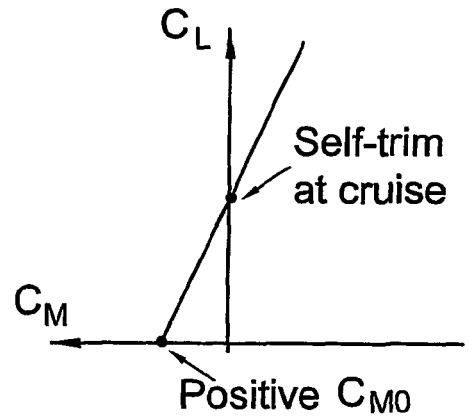
FIG. 7 is a diagram of the lift coefficient $C_L$ v/s the pitch moment coefficient $C_M$ for the self-trimming X-plane arrangement.
Figure 8:
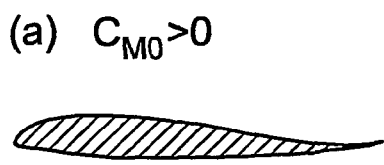
FIG. 8 shows two preferable airfoils used in the X-plane arrangement.
Figure 8:
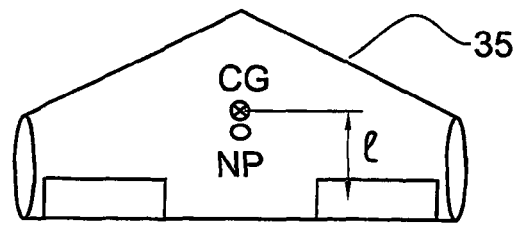
Figure 8:
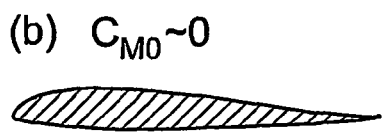

The inventive tandem configuration 15 is a self-trimmed arrangement with constrained pitching moment. Such arrangement does not require deflection of control surfaces with associated trim drag losses at the design point of cruise flight (FIG. 7). For this purpose, the configuration is designed with positive zero-lift pitching moment ($C_{M0}$) that may be achieved in two ways:

employing airfoils with positive zero lift pitching moment (see FIG. 8, a).

The effect of the positive moments is enhanced by the larger local chords of the tapered aft wing 14;

employing twist distribution.

The slipstream of front propeller assembly may contribute to positive $C_{M0}$ at high thrust coefficient.

Thus, the employed positive zero lift pitching moment and/or twist distribution satisfies, as a "package solution", simultaneously all requirements:

maximum lift and stall-self recovery;
self-trimmed at design point;
reduced induced drag.

Elevon Efficiency

Figure 9:
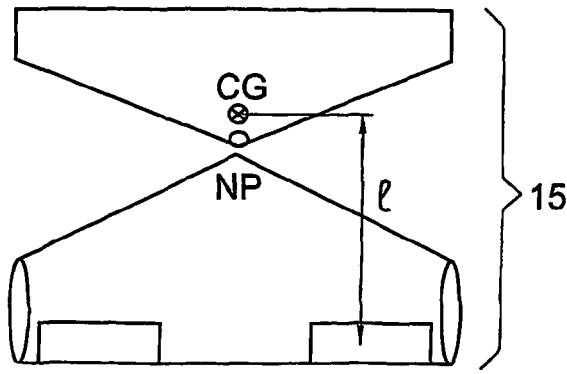
FIG. 9 is an illustration of the increased elevon arm l in the X-plane arrangement v/s the elevon arm in a single-wing arrangement.

With reference to FIG. 9, the suggested tandem arrangement 15 of two lifting surfaces (fore and aft) results in more forward location of the neutral point relative to single wing configuration 35. Since, for stable aircraft configuration, the center of gravity CG should be located prior to the neutral point NP, the suggested arrangement produces a significant increase of elevon arm l and improved control power in the longitudinal plane. Apart from enhanced maneuver capabilities, this allows design for extended range of center of gravity locations, including flight with increased static margin at high lift coefficients. This feature is especially relevant for development of low Reynolds numbers Micro/Mini UAVs, where allowable static margins (minimum and maximum) and efficiency of control surfaces are the central design issues.

Directional Stability

The forward location of center of gravity increases the arm of side panels 18 mounted on wing tips of the aft wing 14 in the horizontal plane, producing significant increase of directional stability of the configuration v/s the single wing option (similar to the increase of elevon control power). This helps to achieve a favorable ratio between rolling and directional stability, ensuring acceptable flying qualities of the inventive configuration.

The above basic embodiment of the inventive tandem configuration may be changed in various ways without deviating from the scope of the present invention. For example, the aft and fore wing may have rounded or polygonal leading and/or trailing edges. The aspect ratio of the wings may be within the range of 2.5 to 4 for the aft wing and 3 to 5 for the front one.

The forewing may have various planforms with smaller area than the aft wing and should be disposed very close to the aft wing (no more than one chord gap between wings) and possibly overlapping it.

Figure 10A:
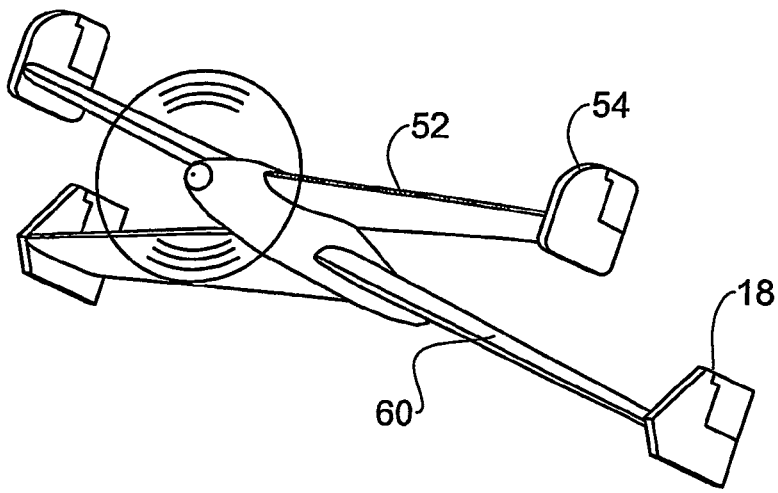
FIGS. 10A, 10B and 10C are schematic views of an UAV configuration with additional features, in accordance with different embodiments of the present invention.
Figure 10B:
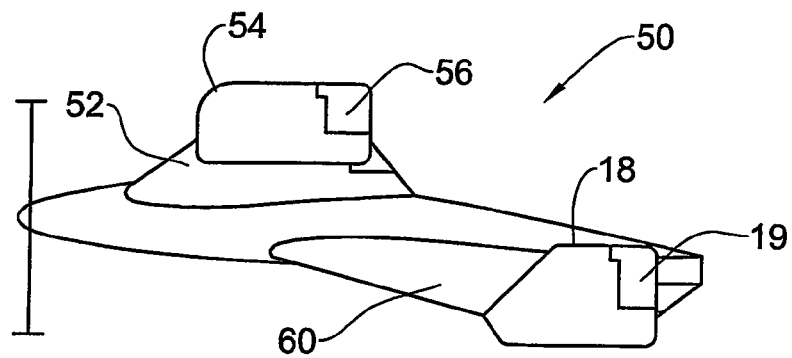
Figure 10C:
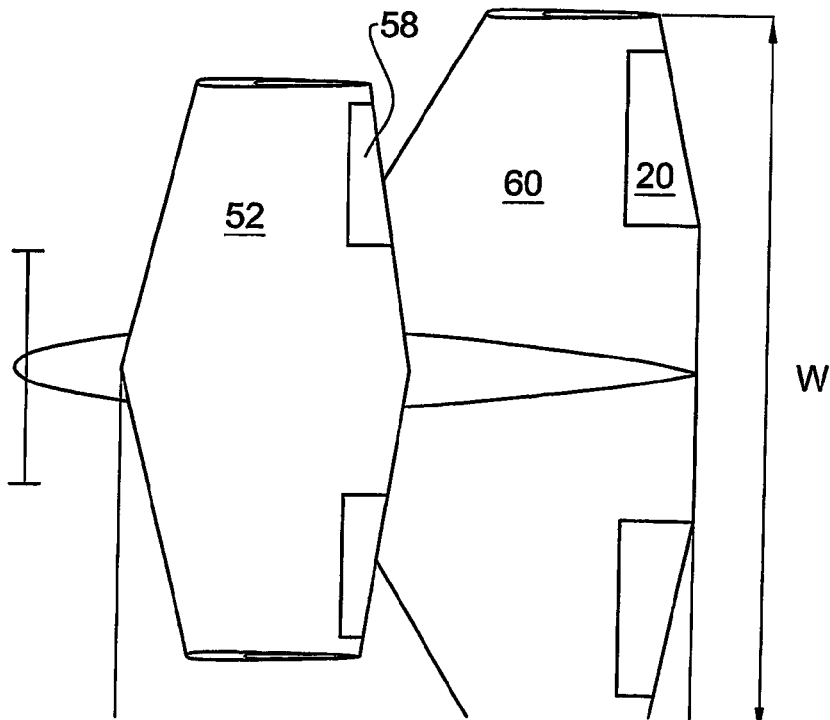

With reference to FIGS. 10A, 10B and 10C, there is shown an arrangement 50 of the X-plane with variations of wing form and additional elements as compared to the basic configuration of FIG. 1. The forewing 52 is a tapered wing with side panels 54, rudder controls 56, and elevators 58. The aft wing 60 has modified planform with partially reversed trailing edge in the area of the elevons 20.

The forewing may be mounted on two pylons above the fuselage, in order to provide higher structural rigidity.

The modification of the X-plane with the elements shown in FIGS. 10A, B and C, has the following additional performance features:

Direct Lift Control

Simultaneous deflection of elevons 20 and elevators 58 (or, the whole fore wing) produces the effect of direct lift control—generation of incremental lift without changing the orientation of the aircraft.

Side Force Control

Simultaneous deflection of fore wing rudders 56 and aft wing rudders 19 on the side panels 54 and 18 respectively, produces an effect of side force control without producing yawing moment. Additional actuators are required for this case.

The X-plane may be designed also as unstable configuration. The unstable configuration allows further increase of maximum lift and maneuverability, with negative values of the overall zero-lift pitching moment $C_{M0}$. For this purpose, the airfoils employed in the wing design may have modest negative values of $C_{M0}$. The increased elevon arm l (see FIG. 9) is very advantageous for the unstable configuration. In this case, part of the elevon travel is used for trim, while the rest is reserved for control and maneuver of the air vehicle. The self-propelled UAV with unstable X-plane configuration may be equipped with a pushing propeller.

The invention claimed is:

1. A self-propelled Micro UAV configured for aerodynamic flight at flight speeds in the range between 10 m/s to 20 m/s at Reynolds numbers in the range between about 20,000 and about 300,000, and comprising a fore wing and an aft wing in tandem close-coupled arrangement,
   wherein a trailing edge of said fore wing is spaced from a leading edge of said aft wing by a positive gap,
   wherein an average value for said gap is less than a root chord of said fore wing,
   wherein said aft wing has side panels and control surfaces on at least one of said aft wing and said side panels, and a tapered planform with positive sweep, said fore wing has non-positive trailing edge sweep, the fore wing and aft wing being disposed at different heights, and said arrangement being free of additional wings or tail arrangement, said Reynolds numbers being based on a characteristic chord length of one of said fore wing and said aft wing.

2. The UAV of claim 1, wherein said fore wing has straight trailing edges with negative sweep angle.

3. The UAV of claim 2, wherein said fore wing has negative sweep.

4. The UAV of claim 1, further comprising a fuselage.

5. The UAV of claim 4, wherein said fore wing is unconnected from said aft wing independently of said fuselage.

6. The UAV of claim 4, wherein said fore wing is mounted on the upper side of said fuselage on at least one pylon.

7. The UAV of claim 6, wherein said fore wing is disposed higher than said aft wing at least by the length of an average aft wing chord.

8. The UAV of claim 1, wherein said fore wing and said aft wing partially overlap each other in plan view.

9. The UAV of claim 1, wherein the fore wing, the aft wing and other elements of said UAV are disposed so as to provide longitudinal aerodynamic stability.

10. The UAV of claim 9, wherein said arrangement has positive pitching moment at zero lift.

11. The UAV of claim 1, wherein at least one of said aft wing and said fore wing has rounded tips.

12. The UAV of claim 1, wherein at least a portion of the trailing edge of said aft wing has negative or positive sweep angle.

13. The UAV of claim 1, wherein said aft wing has aspect ratio between 2.5 and 4.

14. The UAV of claim 1, wherein said fore wing has aspect ratio between 3 and 5.

15. The UAV of claim 1, wherein planform areas of the aft wing and the fore wing are in ratio between 2:1 and 1:1.

16. The UAV of claim 1, wherein said control surfaces comprise rudder control surfaces on said side panels.

17. The UAV of claim 1, wherein said fore wing has side panels.

18. The UAV of claim 17, wherein said fore wing has rudder control surfaces on its side panels.

19. The UAV of claim 1, wherein said fore wing has control surfaces.

20. The UAV of claim 1, wherein said self-propelled UAV has a tractor propeller mounted in front of said tandem arrangement.

21. The UAV of claim 1, wherein at least one of said fore wing and said aft wing has non-zero dihedral angle.

22. The UAV of claim 21, wherein the dihedral angles of the fore wing and of the aft wing are such that the vertical distance between wing tips of said fore wing and said aft wing is greater than the vertical distance between their respective wing roots.

23. The UAV of claim 1, wherein said aft wing has twist.

24. The UAV of claim 1, wherein said fore wing has twist.

25. The UAV of claim 1, wherein said aft wing has positive angle of incidence.

26. The UAV of claim 1, wherein said aft wing has airfoil sections with positive zero lift pitching moment.

27. The UAV of claim 1, wherein the fore wing, the aft wing and other elements of said UAV are disposed so as to provide longitudinal aerodynamic instability.

28. The UAV of claim 27, wherein said self-propelled UAV has a pushing propeller mounted after said tandem arrangement.

29. The UAV of claim 27 having negative pitching moment at zero-lift.

30. The UAV according to claim 1, wherein said UAV is a micro-UAV and has at least one of a maximum longitudinal length and a maximum wingspan not greater than about 15 cm.

31. The UAV according to claim 1, wherein said UAV is a mini-UAV and has at least one of a maximum longitudinal length and a maximum wingspan between about 20 cm and about 1.2 m.

32. The UAV of claim 1, wherein said characteristic chord is an average chord taken between a root and a tip of said main wing.

33. The UAV of claim 1, wherein said main wing is said aft wing.

34. A self-propelled Micro UAV configured for aerodynamic flight at flight speeds in the range between about 10 m/s to about 20 m/s at Reynolds numbers in the range between about 20,000 and about 300,000, and comprising a fore wing and an aft wing in tandem close-coupled arrangement,
   wherein a trailing edge of said fore wing is spaced from a leading edge of said aft wing by a positive flap,
   wherein an average value for said flap is less than a root chord of said fore wing,
   wherein said aft wing has side panels and control surfaces on at least one of said aft wing and said side panels, and a tapered planform with positive sweep, said fore wing has non-positive trailing edge sweep, said fore wing and said aft wing being disposed at different heights, and said arrangement being free of additional wings or tail arrangement,
   wherein said Reynolds numbers are based on a characteristic chord length of one of said fore wing and said aft wing,
   wherein said tandem arrangement of said fore wing and said aft wing has an overall width W and an overall length L including any control surfaces of said UAV, and the sum of both fore and aft wing planform areas of said tandem arrangement is at least 70% of the product W×L.

35. A self-propelled Micro UAV configured for aerodynamic flight at flight speeds in the range between 10 m/s to 20 m/s at Reynolds numbers in the range between about 20,000 and about 300,000 and comprising a fore wing and an aft wing in tandem close-coupled arrangement,
   wherein a trailing edge of said fore wing is spaced from a leading edge of said aft wing by a gap,
   wherein an average value for said gap is less than a root chord of said fore wing,
   wherein said aft wing has first side panels and control surfaces on at least one of said aft wing and said side panels, and a tapered planform with positive sweep, said fore wing has non-positive trailing edge sweep, said fore wing and said aft wing being disposed at different heights, and said arrangement being free of additional wings or tail arrangement, wherein said Reynolds numbers are based on a characteristic chord length of one of said fore wing and said aft wing, and wherein a planform area of the aft wing is not less than a planform area of the fore wing.

36. The UAV according to claim 35, wherein planform areas of the aft wing and the fore wing are in ratio between 2:1 and 1:1.

37. The UAV according to claim 35, wherein said tandem arrangement of said fore wing and said aft wing has an overall width W and an overall length L including any control surfaces of said UAV, and the sum of both fore and aft wing planform areas of said tandem arrangement is at least 70% of the product W×L.

38. The UAV according to claim 35, wherein said UAV is a micro-UAV and has at least one of a maximum longitudinal length and a maximum wingspan not greater than about 15 cm.

39. The UAV according to claim 35, wherein said UAV is a mini-UAV and has at least one of a maximum longitudinal length and a maximum wingspan between about 20 cm and about 1.2 m.

40. The UAV of claim 35, wherein said characteristic chord is an average chord taken between a root and a tip of said main wing.

41. The UAV of claim 35, wherein said main wing is said aft wing.

42. The UAV of claim 35, wherein the fore wing comprises second side panels, said first side panels being different from said second side panels.

* * * * *